US012361864B2

(12) United States Patent
Kim et al.

(10) Patent No.: US 12,361,864 B2
(45) Date of Patent: Jul. 15, 2025

(54) PIXEL CIRCUIT AND DRIVING METHOD FOR DISPLAY DEVICE INCLUDING THE PIXEL CIRCUIT

(71) Applicant: c/o Samsung Display Co., LTD., Yongin-si (KR)

(72) Inventors: Hyun Joon Kim, Yongin-si (KR); Min Kyu Woo, Yongin-si (KR); Bon Yong Koo, Yongin-si (KR); Min Jae Jeong, Yongin-si (KR); Seon Young Choi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/506,942

(22) Filed: Nov. 10, 2023

(65) Prior Publication Data

US 2024/0257723 A1 Aug. 1, 2024

(30) Foreign Application Priority Data

Jan. 30, 2023 (KR) ........................ 10-2023-0011972

(51) Int. Cl.
*G09G 3/32* (2016.01)

(52) U.S. Cl.
CPC ....... *G09G 3/32* (2013.01); *G09G 2310/0267* (2013.01); *G09G 2310/06* (2013.01); *G09G 2310/061* (2013.01); *G09G 2310/08* (2013.01)

(58) Field of Classification Search
CPC ............. G09G 3/32; G09G 2310/0267; G09G 2310/06; G09G 2310/061; G09G 2310/08
See application file for complete search history.

(56) References Cited

U.S. PATENT DOCUMENTS

| | | | |
|---|---|---|---|
| 7,317,403 | B2 | 1/2008 | Grootes et al. |
| 8,305,336 | B2 | 11/2012 | Park et al. |

(Continued)

FOREIGN PATENT DOCUMENTS

| | | | |
|---|---|---|---|
| CN | 101253813 | B | 12/2010 |
| KR | 10-2019-0081909 | A | 7/2019 |

(Continued)

OTHER PUBLICATIONS

US Office Action dated Sep. 11, 2024, issued in U.S. Appl. No. 18/482,665 (10 pages).

(Continued)

*Primary Examiner* — Peter D McLoone
(74) *Attorney, Agent, or Firm* — Womble Bond Dickinson (US) LLP

(57) ABSTRACT

A pixel circuit including a constant current driver including a first driving transistor for controlling a current through a light-emitting element, a first electrode thereof being connected to a first power source, and a second electrode thereof being connected to an anode electrode of the light-emitting element, and an emission time controller including a second driving transistor between a second power source and the constant current driver, and configured to control the emission time by turning off the first driving transistor after a time at which a Pulse Width Modulation data voltage corresponding to an input image is applied to a gate electrode of the second driving transistor, and based on a magnitude of the PWM data voltage, wherein the second driving transistor is turned on based on the magnitude of the PWM data voltage, to transfer a driving voltage from the second power source to the constant current driver.

20 Claims, 10 Drawing Sheets

(56) References Cited

U.S. PATENT DOCUMENTS

| | | | | |
|---|---|---|---|---|
| 9,779,657 | B2 | 10/2017 | Kim et al. | |
| 10,614,762 | B2 | 4/2020 | Kim et al. | |
| 10,867,555 | B2 | 12/2020 | Kim et al. | |
| 2020/0111404 | A1 | 4/2020 | Kim et al. | |
| 2022/0190074 | A1 | 6/2022 | Zhao et al. | |
| 2023/0095998 | A1 * | 3/2023 | Hashikaki | G09G 3/3258<br>345/204 |
| 2023/0196981 | A1 * | 6/2023 | Kwon | G09G 3/3233<br>345/55 |
| 2023/0238372 | A1 | 7/2023 | Lee et al. | |

FOREIGN PATENT DOCUMENTS

| | | | |
|---|---|---|---|
| KR | 10-2019-0081961 | A | 7/2019 |
| KR | 10-2072795 | B1 | 2/2020 |
| KR | 10-2022-0000895 | A | 1/2022 |
| KR | 10-2023-0113472 | A | 7/2023 |

OTHER PUBLICATIONS

US Notice of Allowance dated Jan. 7, 2025, issued in U.S. Appl. No. 18/482,665 (7 pages).

* cited by examiner

PIXEL CIRCUIT AND DRIVING METHOD FOR DISPLAY DEVICE INCLUDING THE PIXEL CIRCUIT

CROSS-REFERENCE TO RELATED APPLICATION

This application claims priority to, and the benefit of, Korean Patent Application No. 10-2023-0011972 filed on Jan. 30, 2023, in the Korean Intellectual Property Office, the entire disclosure of which is incorporated herein by reference.

BACKGROUND

1. Field

The present disclosure generally relates to a pixel circuit, and to a driving method for a display device including the pixel circuit.

2. Description of the Related Art

With the development of information technologies, the importance of a display device, which is a connection medium between a user and information, increases. Accordingly, display devices, such as a liquid crystal display device and an organic light-emitting display device, are increasingly used.

Recently, studies on micro LEDs, which have a high response speed and can implement a high luminance as compared with the existing LEDs, have been actively conducted. In the case of inorganic light-emitting elements, such as micro LEDs, when a Pulse Amplitude Modulation (PAM) pixel driving method is used (e.g., in organic LEDs), it may be difficult to accurately implement a desired luminance as the peak wavelength of current is moved according to a current density. Therefore, in the case of micro LEDs, a Pulse Width Modulation (PWM) pixel driving method may be used, in which a luminance is expressed by controlling the time for which a current flows through a light-emitting element.

When micro LEDs are applied to a large-sized display device, it may be suitable to apply an internal compensation circuit or an external compensation circuit, which may be used to compensate for a driving characteristic difference between a plurality of pixels. Accordingly, studies on internal compensation circuits of display devices including micro LEDs have recently been actively conducted.

SUMMARY

Embodiments provide a pixel circuit capable of effectively performing an internal compensation operation of the pixel circuit using a PWM pixel driving method.

In accordance with an aspect of the present disclosure, there is provided a pixel circuit for adjusting a luminance of a pixel by controlling an emission time of a light-emitting element within one image frame period, the pixel circuit including a constant current driver including a first driving transistor for controlling a driving current through a light-emitting element from a first power source, a first electrode of the first driving transistor being connected to the first power source, and a second electrode of the first driving transistor being connected to an anode electrode of the light-emitting element, and an emission time controller including a second driving transistor between a second power source and the constant current driver, the emission time controller being configured to control the emission time by turning off the first driving transistor after a time at which a Pulse Width Modulation (PWM) data voltage corresponding to an input image is applied to a gate electrode of the second driving transistor, and based on a magnitude of the PWM data voltage, wherein the second driving transistor is configured to be turned on based on the magnitude of the PWM data voltage, to transfer a driving voltage applied from the second power source to the constant current driver.

The emission time controller may further include a PWM data input for supplying the PWM data voltage to the gate electrode of the second driving transistor, and a sweep signal transferer for allowing a potential of the gate electrode of the second driving transistor to linearly decrease after the PWM data voltage is supplied to the gate electrode of the second driving transistor, wherein the constant current driver further includes a Pulse Amplitude Modulation (PAM) voltage input for setting a potential of a gate electrode of the first driving transistor for supplying the driving current to the anode electrode of the light-emitting element, and a compensation operation controller for performing a compensation operation of compensating for a threshold voltage or a mobility of the first driving transistor, wherein the second driving transistor is configured to be turned on at a time at which the potential of the gate electrode of the second driving transistor becomes lower than a threshold voltage of the second driving transistor according to a sweep signal, to transfer the driving voltage to the constant current driver, and wherein the first driving transistor is configured to be turned off at a time at which the potential of the gate electrode of the first driving transistor becomes higher than the threshold voltage of the first driving transistor due to the driving voltage, to stop a light emission operation of the light-emitting element.

The constant current driver may further include a first capacitor between the gate electrode of the first driving transistor and the PAM voltage input, and configured to store a voltage corresponding to a PAM voltage, a first transistor between a reference power source and a first reference node, which is between the first capacitor and the PAM voltage input, and configured to transfer a reference voltage to the first reference node, a third capacitor connected in parallel to the first transistor between the first reference node and the reference power source, a second transistor between an initialization power source and the anode electrode, and configured to transfer a first initialization voltage, and a third transistor between the gate electrode of the first driving transistor and the initialization power source, and configured to transfer a second initialization voltage to the gate electrode of the first driving transistor, wherein the emission time controller further includes a second capacitor between the gate electrode of the second driving transistor and the sweep signal transferer, and configured to store the PWM data voltage, and a fourth transistor between the gate electrode of the second driving transistor and the initialization power source, and configured to transfer the second initialization voltage to the gate electrode of the second driving transistor, wherein the compensation operation controller includes a fifth transistor between the second electrode of the first driving transistor and the gate electrode of the first driving transistor, wherein the PWM data input includes a sixth transistor between a data line to which the PWM data voltage is input and a first electrode of the second driving transistor, and a seventh transistor between a second electrode of the second driving transistor and the gate electrode of the second driving transistor, wherein the PAM voltage input includes an eighth transistor between a PAM voltage input terminal and the first reference node, and wherein the sweep signal transferer includes a ninth transistor connected to a second reference node that is between a sweep signal input terminal and the second capacitor, and configured to transfer, to the second reference node, a sweep initialization voltage for initializing the second reference node.

The one image frame period may include an initialization period in which the first and second reference nodes or the gate electrodes of the first and second driving transistors are initialized, a PWM data input and compensation period in which the PWM data voltage is input and the compensation operation is performed, a PAM voltage input period in which the PAM voltage is input, and an emission period in which the light-emitting element emits light, wherein, in the initialization period, each of the first reference node, the anode electrode, the gate electrode of the first driving transistor, the gate electrode of the second driving transistor, and the second reference node is initialized as the first transistor, the second transistor, the third transistor, the fourth transistor, and the ninth transistor are turned on, wherein, in the PWM data input and compensation period, the compensation operation is performed as the fifth transistor is turned on, and as the PWM data voltage is supplied to the gate electrode of the second driving transistor as the sixth transistor and the seventh transistor are turned on, and wherein, in the PAM voltage input period, the eighth transistor is turned on to transfer the PAM voltage to the first reference node.

The constant current driver may further include a first emission controller including a tenth transistor between the second electrode of the first driving transistor and the anode electrode of the light-emitting element, wherein the emission time controller further includes a second emission controller including an eleventh transistor between the first electrode of the second driving transistor and the second power source, and a twelfth transistor between the second electrode of the second driving transistor and the first reference node, wherein the tenth transistor is configured to be turned on during the emission period to transfer the driving current flowing through the first driving transistor to the anode electrode, and wherein the eleventh transistor and the twelfth transistor are configured to be turned on during the emission period to transfer the driving voltage to the first reference node.

The constant current driver may further include a thirteenth transistor between the anode electrode of the light-emitting element and the data line, and configured to detect a voltage applied from the first power source.

A gate electrode of the third transistor and a gate electrode of the fourth transistor may be configured to receive a same signal.

A gate electrode of the fifth transistor, a gate electrode of the sixth transistor, and a gate electrode of the seventh transistor may be configured to receive a same signal.

The reference power source may be the same as the first power source or the second power source.

The initialization power source may include a first initialization power source connected to a cathode electrode of the light-emitting element for supplying the first initialization voltage, and a second initialization power source for supplying the second initialization voltage.

The initialization power source may include a first initialization power source for supplying the first initialization voltage and a second initialization power source for supplying the second initialization voltage, and wherein a magnitude of the first initialization voltage is configured to be adjusted according to a magnitude of a voltage of a third power source connected to a cathode electrode of the light-emitting element.

In accordance with another aspect of the present disclosure, there is provided a method for driving a display device including a pixel circuit for adjusting a luminance of a pixel by controlling an emission time of a light-emitting element within one image frame period, the method including performing a compensation operation of compensating for a threshold voltage or a mobility of a first driving transistor of the pixel circuit to control a driving current flowing through a light-emitting element from a first power source, applying a PWM data voltage corresponding to an input image to a gate electrode of a second driving transistor of the pixel circuit, turning on the first driving transistor by applying a PAM voltage to a first node, allowing the light-emitting element to emit light by applying an emission control signal to the pixel circuit, and transferring a driving voltage from a second power source to a first reference node by turning on the second driving transistor after applying the PWM data voltage when the emission control signal is applied to the pixel circuit to turn off the first driving transistor.

The pixel circuit may include a first capacitor connected to a gate electrode of the first driving transistor, and a second capacitor connected to the gate electrode of the second driving transistor, wherein the transferring of the driving voltage to the first reference node includes inputting, to the second capacitor, a sweep signal for linearly decreasing a potential of the gate electrode of the second driving transistor as time elapses from when the emission control signal is applied to the pixel circuit, wherein the second driving transistor is turned on when the potential of the gate electrode of the second driving transistor becomes lower than a threshold voltage of the second driving transistor according to the sweep signal, and wherein the first driving transistor is turned off at a time at which a potential of the gate electrode of the first driving transistor becomes higher than the threshold voltage of the first driving transistor according to the driving voltage.

The method may further include performing an initialization operation of initializing the gate electrodes of the first driving transistor and the second driving transistor, an anode electrode of the light-emitting element, the first reference node, and a second reference node before the compensation operation is performed, wherein the performing of the initialization operation includes providing the pixel circuit with a reset signal for initializing the anode electrode, the first reference node, and the second reference node, providing the pixel circuit with a first initialization signal for initializing the gate electrode of the first driving transistor, and providing the pixel circuit with a second initialization signal for initializing the gate electrode of the second driving transistor.

The first initialization signal and the second initialization signal may be a same signal.

The providing of the pixel circuit with the reset signal may include providing the reset signal to a gate electrode of a first transistor that is between a reference power source and the first reference node, wherein the reference power source is the same as the first power source or the second power source.

The providing of the pixel circuit with the reset signal may include providing the reset signal to a gate electrode of a second transistor that is between an initialization power source and the anode electrode, wherein the providing of the pixel circuit with the second initialization signal includes providing the second initialization signal to a gate electrode of a third transistor that is between the initialization power source and the gate electrode of the first driving transistor, wherein the providing of the pixel circuit with the second initialization signal includes providing the second initialization signal to a gate electrode of a fourth transistor that is between the initialization power source and the gate electrode of the second driving transistor, wherein the initialization power source includes a first initialization power source for initializing the anode electrode, and a second initialization power source for initializing the gate electrode of the first driving transistor and the gate electrode of the second driving transistor, and wherein the first initialization power source is connected to a cathode electrode of the light-emitting element.

The providing of the pixel circuit with the reset signal may include providing the reset signal to a gate electrode of a second transistor that is between an initialization power source and the anode electrode, wherein the providing of the pixel circuit with the first initialization signal includes providing the first initialization signal to a gate electrode of a third transistor that is between the initialization power source and the gate electrode of the first driving transistor, wherein the providing of the pixel circuit with the second initialization signal includes providing the second initialization signal to a gate electrode of a fourth transistor that is between the initialization power source and the gate electrode of the second driving transistor, wherein the initialization power source includes a first initialization power source for initializing the anode electrode, and a second initialization power source for initializing the gate electrode of the first driving transistor and the gate electrode of the second driving transistor, and wherein a magnitude of an initialization voltage provided from the first initialization power source is adjusted according to a magnitude of a voltage applied to a third power source connected to a cathode electrode of the light-emitting element.

The performing of the compensation operation may include providing a compensation control signal, which is for compensating for the threshold voltage or the mobility of the first driving transistor with respect to the pixel circuit, to a gate electrode of a fifth transistor that is between a gate electrode and a drain electrode of the first driving transistor, wherein the applying of the PWM data voltage includes inputting a data control signal, which is for applying the PWM data voltage to the gate electrode of the second driving transistor, to a gate electrode of a sixth transistor that is between a data line and a source electrode of the second driving transistor, and to a gate electrode of a seventh transistor that is between the gate electrode of the second driving transistor and the source electrode of the second driving transistor.

The compensation control signal and the data control signal may be connected to a same signal line, and are concurrently transferred to the pixel circuit.

BRIEF DESCRIPTION OF THE DRAWINGS

Embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
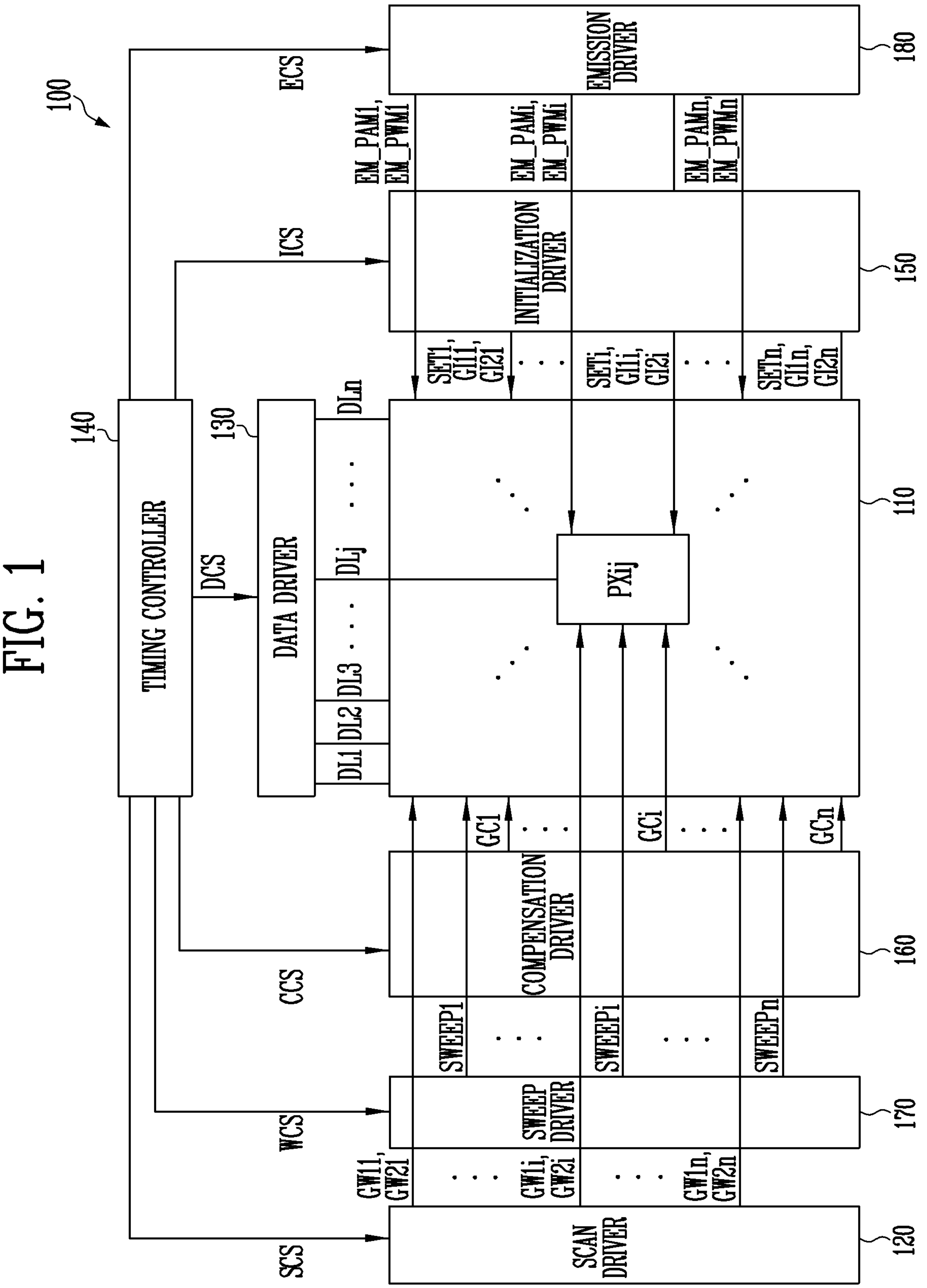
FIG. 1 is a block diagram of a display device in accordance with one or more embodiments of the present disclosure.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may have various modifications and may be embodied in different forms, and should not be construed as being limited to only the illustrated embodiments herein. Further, each of the features of the various embodiments of the present disclosure may be combined or combined with each other, in part or in whole, and technically various interlocking and driving are possible. Each embodiment may be implemented independently of each other or may be implemented together in an association. The described embodiments are provided as examples so that this disclosure will be thorough and complete, and will fully convey the aspects of the present disclosure to those skilled in the art, and it should be understood that the present disclosure covers all the modifications, equivalents, and replacements within the idea and technical scope of the present disclosure. Accordingly, processes, elements, and techniques that are not necessary to those having ordinary skill in the art for a complete understanding of the aspects of the present disclosure may not be described.

Unless otherwise noted, like reference numerals, characters, or combinations thereof denote like elements throughout the attached drawings and the written description, and thus, descriptions thereof will not be repeated. Further, parts that are not related to, or that are irrelevant to, the description of the embodiments might not be shown to make the description clear.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form to avoid unnecessarily obscuring various embodiments.

It will be understood that when an element, layer, region, or component is referred to as being "connected to," or "(operatively or communicatively) coupled to," another element, layer, region, or component, it can be connected to, or coupled to, the other element, layer, region, or component, or indirectly connected to, or coupled to, the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled" refers to one component directly connecting or coupling another component without an intermediate component. In addition, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expression such as "at least one of A and B" and "at least one of A or B" may include A, B, or A and B. As used herein, "or" generally means "and/or," and the term "and/or" includes any and all combinations of one or more of the associated listed items. For example, the expression such as "A and/or B" may include A, B, or A and B. Similarly, expressions such as "at least one of," "a plurality of," "one of," and other prepositional phrases, when preceding a list of elements, modify the entire list of elements and do not modify the individual elements of the list.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

The terminology used herein is for the purpose of describing particular embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

Further, in description, the expression "equal" may mean "substantially equal." That is, this may mean equality to a degree to which those skilled in the art can understand the equality. Other expressions may be expressions in which "substantially' is omitted.

Some embodiments are described in the accompanying drawings in relation to functional block, unit, and/or module. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram of a display device in accordance with one or more embodiments of the present disclosure.

Referring to FIG. 1, the display device 100 in accordance with one or more embodiments of the present disclosure may include a display 110, a scan driver 120, a data driver 130, a timing controller 140, an initialization driver 150, a compensation driver 160, a sweep driver 170, and an emission driver 180.

The display device 100 may be a flat panel display device, a flexible display device, a curved display device, a foldable display device, or a bendable display device. Also, the display device 100 may be applied to a transparent display device, a head-mounted display device, a wearable display device, and the like. Also, the display device 100 may be applied to various electronic devices including a smartphone, a tablet, a smart pad, a TV, a monitor, and the like.

Meanwhile, the display device 100 may be a self-luminous display device including an organic light-emitting display device, a liquid crystal display device, or an inorganic light-emitting element. However, this is merely illustrative, and the configuration of the display device 100 is not limited thereto.

The display 110 may include pixels PX located to be connected to a plurality of vertical lines, e.g., a plurality of data lines DL1 to DLn (n is a natural number) and a plurality of horizontal lines. In addition, in one or more embodiments, the pixels PX may be supplied with voltages from an external power source. The display 110 may receive a data voltage corresponding to an input image from the data driver 130 through the plurality of data lines DL1 to DLn. The display 110 may receive driving signals for driving a plurality of pixel circuits included in the display 110 from a plurality of drivers included in the display device 100 through the plurality of horizontal lines.

In one or more embodiments, transistors included in the pixel PX may be implemented with a P-type oxide thin film transistor. For example, the oxide thin film transistor may be a Low Temperature Polycrystalline Oxide (LTPO) thin film transistor. However, this is merely illustrative, and the P-type transistors are not limited thereto. For example, an active pattern (semiconductor layer) included in the transistors may include an inorganic semiconductor (e.g., amorphous silicon or poly-silicon), an organic semiconductor, or the like. In addition, at least one of the transistors included in the display device 100 and/or the pixel PX may be replaced with an N-type transistor.

The timing controller 140 may generate a plurality of control signals for controlling the plurality of drivers included in the display device 100, which include a data-driving control signal DCS, corresponding to externally supplied synchronization signals. The plurality of control signals generated by the timing controller 140 may be respectively supplied to corresponding drivers. For example, in FIG. 1, the data-driving control signal DCS for controlling the data driver 130 may be supplied to the data driver 130. For example, a scan-driving control signal SCS for controlling the scan driver 120 may be supplied to the scan driver 120. For example, an initialization-driving control signal ICS for controlling the initialization driver 150 may be supplied to the initialization driver 150. For example, a compensation-driving control signal CCS for controlling the compensation driver 160 may be supplied to the compensation driver 160. For example, a sweep-driving control signal WCS for controlling the sweep driver 170 may be supplied to the sweep driver 170. For example, an emission-driving control signal ECS for controlling the emission driver 180 may be supplied to the emission driver 180.

A control start signal and clock signals may be included in each of the control signals supplied to the plurality of drivers. The control start signal may control a timing of the control signal. The clock signals may be used to shift the control start signal.

The scan driver 120 may receive the scan-driving control signal SCS from the timing controller 140. The scan driver 120 supplied with the scan-driving control signal SCS may supply a scan signal to the display 110 through a plurality of horizontal lines. The scan signal may include a first scan signal GW1 and a second scan signal GW2. The first scan signal GW1 may mean a signal for apply a Pulse Width Modulation (PWM) data voltage to a gate of a driving transistor included in an emission time controller, which will be described later. The second scan signal GW2 may mean a signal for applying a Pulse Amplitude Modulation (PAM) voltage to a gate of a driving transistor included in a constant current driver, which will be described later.

The initialization driver 150 may receive the initialization-driving control signal from the timing controller 140. The initialization driver 150 supplied with the initialization-driving control signal ICS may supply an initialization signal to the display 110 through a plurality of horizontal lines. The initialization signal may include a reset signal SET, a first initialization signal GI1, and a second initialization signal GI2. The reset signal SET may mean a signal for initializing a reference node or an anode electrode, which will be described later. The first initialization signal GI1 may mean a signal for initializing a gate electrode of a first driving transistor, which will be described later. The second initialization signal GI2 may mean a signal for initializing a gate electrode of a second driving transistor, which will be described later.

The compensation driver 160 may receive the compensation-driving control signal CCS from the timing controller 140. The compensation driver 160 supplied with the compensation-driving control signal CCS may supply a compensation control signal GC to the display 110 through a plurality of horizontal lines. The compensation control signal GC may mean a signal for controlling a pixel circuit included in the display 110 to perform a compensation operation of compensating for a threshold voltage or mobility of the first driving transistor.

The sweep driver 170 may receive the sweep-driving control signal WCS from the timing controller 140. The sweep driver 170 supplied with the sweep-driving control signal WCS may supply a sweep signal SWEEP to the display 110 through a plurality of horizontal lines. The sweep signal SWEEP may mean a signal for linearly dropping a potential of the gate electrode of the second driving transistor as time elapses.

The emission driver 180 may receive the emission-driving control signal ECS from the timing controller 140. The emission driver 180 supplied with the emission-driving control signal ECS may supply an emission control signal to the display 110 through a plurality of horizontal lines. The emission control signal may include a first emission control signal EM_PAM and a second emission control signal EM_PWM. The first emission control signal EM_PAM may mean a signal for controlling light emission of a light-emitting element included in the constant current driver, which will be described later. The second emission control signal EM_PWM may mean a signal for applying a driving voltage to a first reference node, which will be described later.

In an example, each of the drivers may sequentially supply a driving control signal to a plurality of horizontal lines. The scan driver 120 will be described as an example. The scan driver 120 may sequentially supply a first scan signal GW1 corresponding to each line among n first scan signals GW11 to GW1*n* to *n* horizontal lines. Also, the scan driver 120 may sequentially supply a second scan signal GW2 corresponding to each line among n second scan signals GW21 to GW2*n* to the n horizontal lines. When a scan signal is sequentially supplied, the pixels PX may be selected in units of horizontal lines. To this end, the scan signal may be set to a gate-on voltage (e.g., a logic low level) such that transistors included in the pixels PX can be turned on.

Methods in which other drivers sequentially supply driving control signals to horizontal lines are the same as the method of the scan driver 120, and therefore, their descriptions will be omitted.

In one or more embodiments, the pixel PX included in the display 110 may include a pixel circuit, which adjusts a luminance of the pixel by controlling a time for which a light-emitting element emits light within one image frame period.

Figure 2:
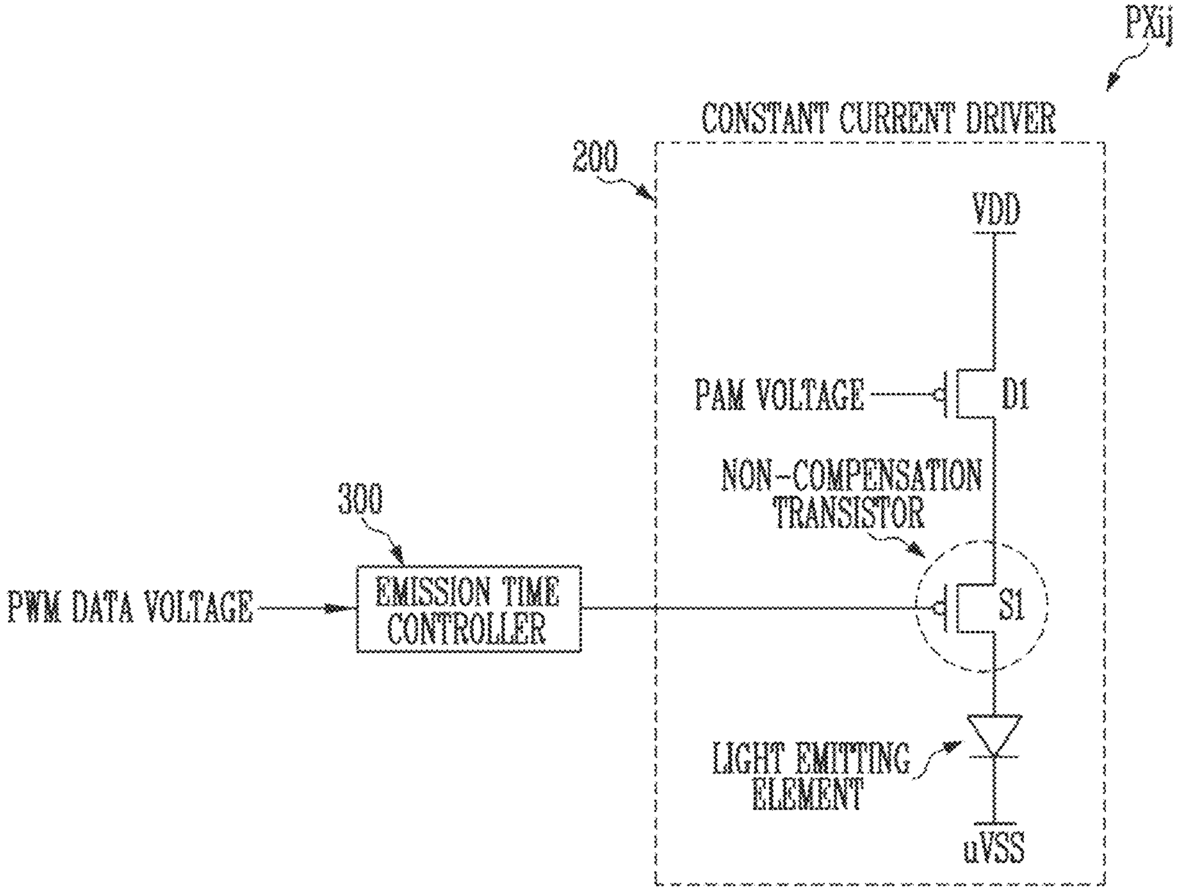
FIG. 2 is a diagram illustrating a Pulse Width Modulation (PWM) pixel circuit in accordance with one or more embodiments of the present disclosure.

FIG. 2 is a diagram illustrating a PWM pixel circuit in accordance with one or more embodiments of the present disclosure.

A pixel shown in FIG. 2 may include a pixel circuit corresponding to a point at which an ith horizontal line and a jth vertical line intersect each other among the plurality of pixel circuits included in the display 110 shown in FIG. 1.

Referring to FIG. 2, in one or more embodiments, the pixel circuit may include a constant current driver 200 and an emission time controller 300.

In one or more embodiments, the constant current driver 200 may include a first driving transistor D1, a light-emitting element, and a switching transistor S1 connected in series to, and located between, the first driving transistor D1 and the light-emitting element. A PAM voltage may be applied to a gate electrode of the first driving transistor D1. The PAM voltage may be a voltage that is applied to the gate electrode of the first driving transistor D1, and that has a magnitude suitable to turn on the first driving transistor D1. In one or more embodiments, the PAM voltage may be a voltage that is not changed according to a luminance that the pixel is to express. In other words, a voltage having the same magnitude may be applied to the gate electrode of the first driving transistor D1, regardless of a luminance corresponding to an input image. Accordingly, an amount of driving current flowing through the light-emitting element via the first driving transistor D1 and the switching transistor S1 from a first power source VDD is not changed according to a luminance, but instead can be substantially constant.

In one or more embodiments, the emission time controller 300 may receive a PWM data voltage, which may be externally provided. The PWM data voltage may be a voltage corresponding to an input image. In other words, a magnitude of the PWM data voltage may be differently set according to the luminance that the pixel is to express. The emission time controller 300 may provide a driving voltage to a gate electrode of the switching transistor S1 when a time corresponding to the magnitude of the PWM data voltage elapses. When the driving voltage is provided to the gate electrode of the switching transistor S1, the switching transistor S1 may be turned off. When the switching transistor S1 is turned off, the driving current may not flow through the light-emitting element. In other words, the light-emitting element may emit light when the PAM voltage is applied to the gate electrode of the first driving transistor D1, and may cease light emission when the time corresponding to the magnitude of the PWM data voltage elapses.

As described in FIG. 2, the luminance of the pixel may be controlled by adjusting a time for which the driving current flows through the light-emitting element, instead of being controlled by a magnitude of the driving current.

In general, when a display device is driven, the magnitude of a threshold voltage or mobility of a driving transistor varies for each pixel, and therefore, a compensation operation for compensating for this may be performed. In one or more embodiments, a threshold voltage of the first driving transistor D1 may be compensated during driving of the pixel circuit. However, a threshold voltage of the switching transistor S1 may not be compensated. A deviation for each pixel may occur with respect to the same luminance according to a threshold voltage deviation of the switching transistor S1 for each pixel. Accordingly, the quality of the display device may be deteriorated.

Figure 3:
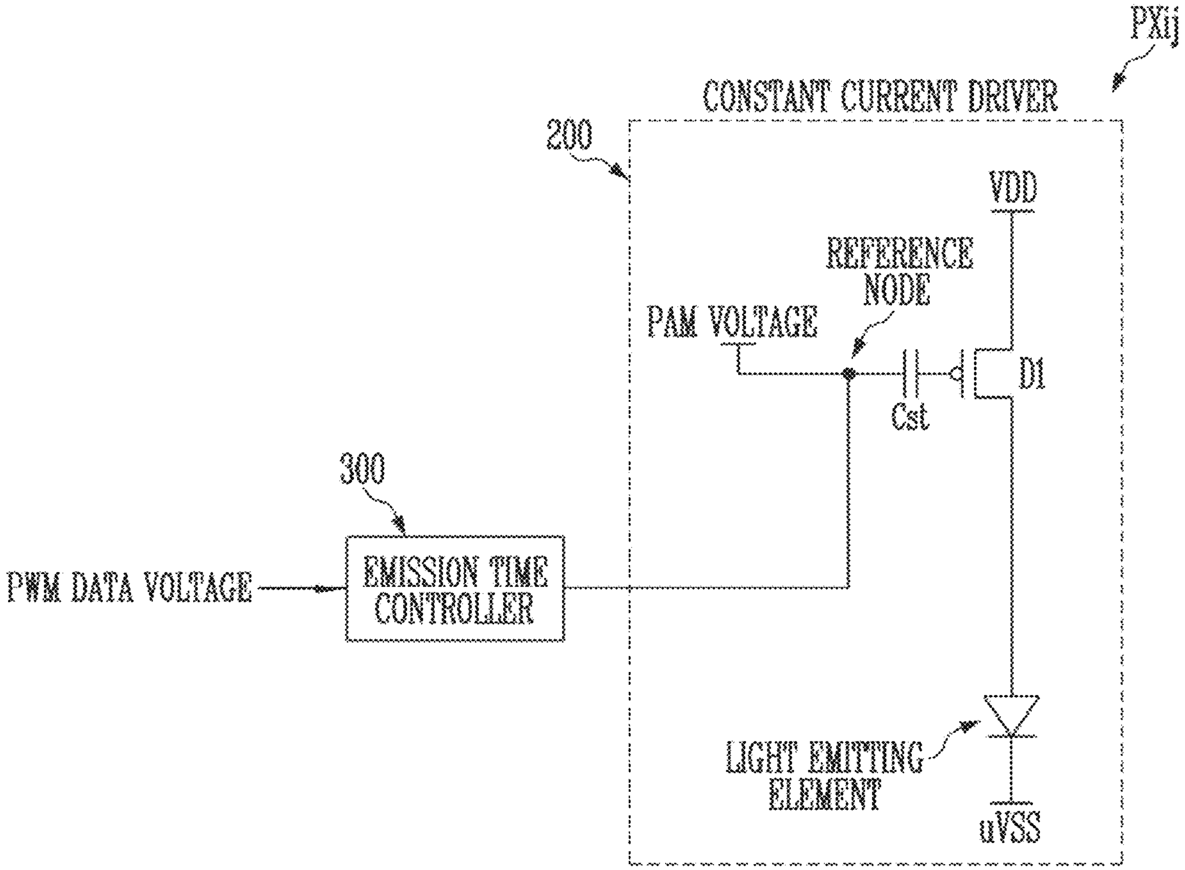
FIG. 3 is a diagram illustrating a PWM pixel circuit in accordance with one or more other embodiments of the present disclosure.

FIG. 3 is a diagram illustrating a PWM pixel circuit in accordance with one or more other embodiments of the present disclosure.

Referring to FIG. 3, in one or more embodiments, the pixel circuit may include a constant current driver 200 and an emission time controller 300.

As compared with the pixel circuit shown in FIG. 2, the pixel circuit shown in FIG. 3 may omit the switching transistor. As compared with the pixel circuit shown in FIG. 2, the pixel circuit shown in FIG. 3 may further include a storage capacitor Cst and a first reference node connected to the storage capacitor Cst. A PAM voltage and a PWM data voltage may be respectively equal to the PAM voltage and the PWM data voltage of the pixel circuit shown in FIG. 2, and therefore, their descriptions will be omitted.

In one or more embodiments, when a voltage having a constant magnitude is applied to the first reference node, a potential of the first reference node may decrease. As the potential of the first reference node decreases, a potential of the gate electrode of the first driving transistor D1 may also decrease due to a coupling effect. When the potential of the gate electrode of the first driving transistor D1 becomes lower than the threshold voltage of the first driving transistor D1, the first driving transistor D1 may be turned on. As the first driving transistor D1 is turned on, a driving current may flow through the light-emitting element via the first driving transistor D1 from the first power source VDD.

As described with reference to FIG. 2, the emission time controller 300 may receive a PWM data voltage corresponding to an externally supplied input image, and may transfer a driving voltage having a constant magnitude to the constant current driver after a time corresponding to the magnitude of the PWM data voltage elapses. Unlike the pixel circuit shown in FIG. 2, in the pixel circuit shown in FIG. 3, the driving voltage may be provided to the first reference node. When the driving voltage having a high level is provided to the first reference node, the potential of the gate electrode of the first driving transistor may increase due to the coupling effect. When the potential of the gate electrode of the first driving transistor becomes higher than the threshold voltage of the first driving transistor D1, the first driving transistor D1 may be turned off.

As described with reference to FIG. 3, the luminance of the pixel may be controlled by adjusting a time for which the driving current flows through the light-emitting element instead of being controlled by a magnitude of the driving current. In addition, unlike the pixel circuit shown in FIG. 2, the pixel circuit shown in FIG. 3 does not include any separate switching transistor. Hence, little to no deviation exists for each pixel with respect to the same luminance, or a small deviation exists as compared with the pixel circuit shown in FIG. 2.

Figure 4:
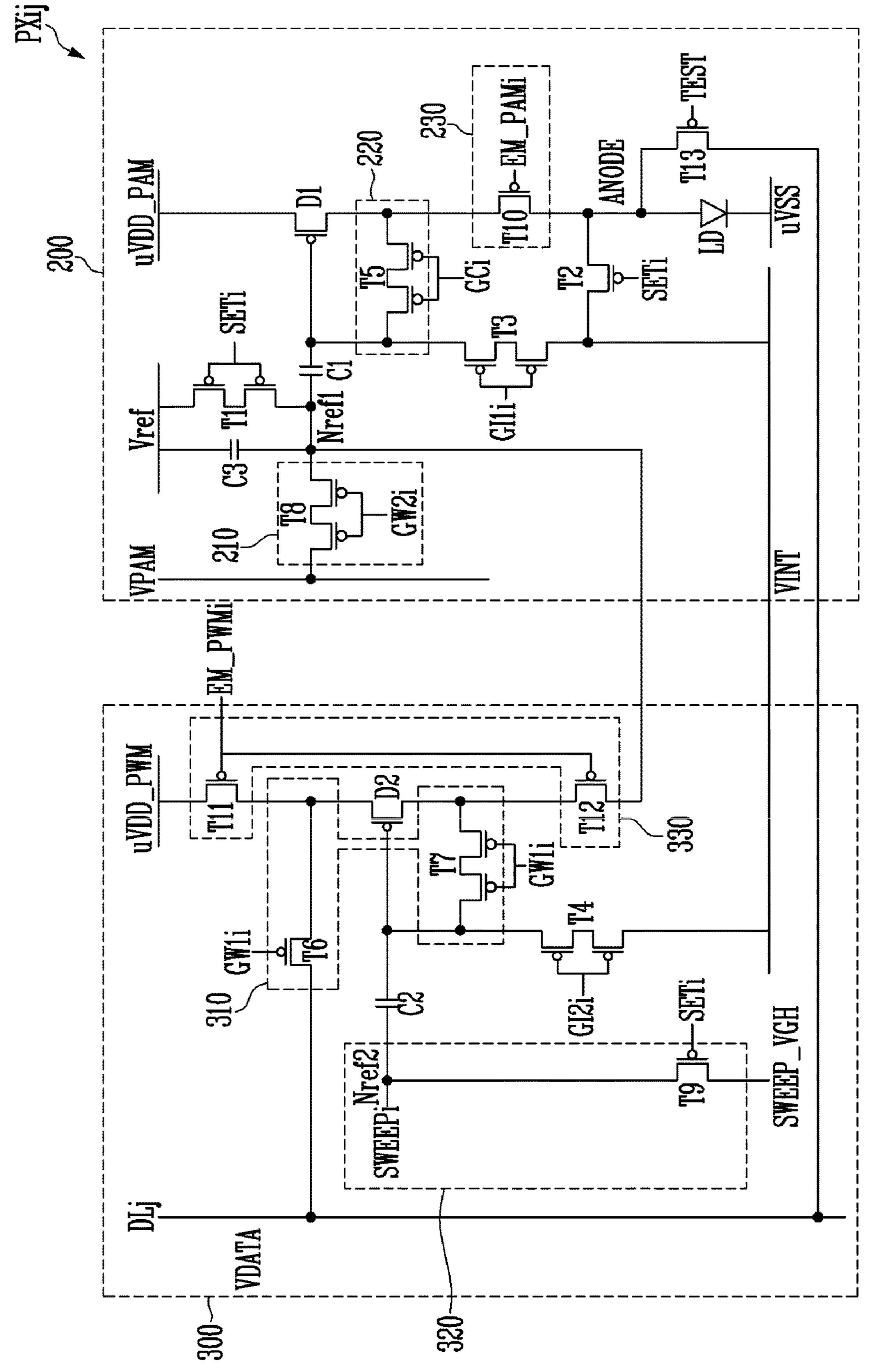
FIG. 4 is a circuit diagram illustrating a configuration and an operation of a PWM pixel circuit in accordance with one or more embodiments of the present disclosure.

FIG. 4 is a circuit diagram illustrating a configuration and an operation of a PWM pixel circuit in accordance with one or more embodiments of the present disclosure.

Referring to FIG. 4, a pixel PXij may include a pixel circuit including a constant current driver 200 and an emission time controller 300.

The constant current driver 200 may include a first driving transistor D1, a light-emitting element LD, a plurality of initialization transistors T1 to T3, and a plurality of capacitors C1 and C3. Also, the constant current driver 200 may further include a PAM voltage input 210, a compensation operation controller 220, and a first emission controller 230.

A first electrode of the first driving transistor D1 may be connected to a first power source VDD. A second electrode of the first driving transistor D1 may be connected to an anode electrode ANODE of the light-emitting element LD. In one or more other embodiments, the first emission controller 230 may be connected between the second electrode of the first driving transistor D1 and the anode electrode ANODE of the light-emitting element LD.

In one or more embodiments, the constant current driver 200 may include a first capacitor C1 connected between a gate electrode of the first driving transistor D1 and the PAM voltage input 210. The constant current driver 200 may include a first transistor T1 connected between a reference power source Vref and a first reference node Nref1 that is located between the first capacitor C1 and the PAM voltage input 210. The constant current driver 200 may include a third capacitor C3 connected in parallel with the first transistor between the first reference node Nref1 and the reference power source Vref. The constant current driver 200 may include a second transistor T2 connected between an initialization power source VINT and the anode electrode ANODE to transfer a first initialization voltage to the anode electrode ANODE, and to a third transistor T3 connected between the gate electrode of the first driving transistor D1 and the initialization power source VINT to transfer a second initialization voltage to the gate electrode of the first driving transistor D1. The initialization power source VINT may mean a power source to which a voltage for initializing a corresponding electrode or a node within the pixel circuit is supplied.

In one or more embodiments, the PAM voltage input 210 may include an eighth transistor T8 connected between a PAM voltage input terminal and the first reference node Nref1. A PAM voltage VPAM having a constant magnitude (e.g., predetermined constant magnitude) may be supplied to the PAM voltage input terminal. The PAM voltage VPAM may have a voltage having a constant magnitude regardless of a luminance that the pixel is to express.

In one or more embodiments, the compensation operation controller 220 may include a fifth transistor T5 connected between the second electrode of the first driving transistor D1 and the gate electrode of the first driving transistor D1.

In one or more embodiments, the first emission controller 230 may include a tenth transistor T10 connected between the second electrode of the first driving transistor D1 and the anode electrode ANODE of the light-emitting element LD.

In one or more embodiments, the constant current driver 200 may further include a thirteenth transistor T13 connected between the anode electrode ANODE of the light-emitting element LD and a data line DLj to detect a voltage applied from the first power source VDD. However, the present disclosure is not limited thereto.

The emission time controller 300 may include a second driving transistor D2, a fourth transistor (e.g., initialization transistor) T4, and a second capacitor C2. Also, the emission time controller 300 may include a PWM data input 310, a sweep signal transferer 320, and a second emission controller 330.

In one or more embodiments, a first electrode of the second driving transistor D2 may be connected to a second power source uVDD_PWM, and a second electrode of the second driving transistor D2 may be connected to the first reference node Nref1 within the constant current driver 200. In one or more other embodiments, the second driving transistor D2 may be connected to the second emission controller 330.

In one or more embodiments, the emission time controller 300 may include a second capacitor C2 connected between a gate electrode of the second driving transistor D2 and the sweep signal transferer 320. The emission time controller 300 may include the fourth transistor T4 connected between the gate electrode of the second driving transistor D2 and the initialization power source VINT.

In one or more embodiments, the PWM data input 310 may include a sixth transistor T6 connected between the data line DLj to which a PWM data voltage VDATA is input, and connected to the first electrode of the second driving transistor D2, and may include a seventh transistor T7 connected between the second electrode of the second driving transistor D2 and the gate electrode of the second driving transistor D2.

In one or more embodiments, the sweep signal transferer 320 may include a ninth transistor T9, which is connected to a second reference node Nref2 that is located between a sweep signal input terminal and the second capacitor C2, to transfer a sweep initialization voltage SWEEP_VGH for initializing the second reference node Nref2 to the second reference node Nref2.

In one or more embodiments, the second emission controller 330 may include an eleventh transistor T11 connected between the second power source uVDD_PWM and the first electrode of the second driving transistor D2, and may include a twelfth transistor T12 connected between the second electrode of the second driving transistor D2 and the first reference node Nref1.

Referring to FIG. 4, the first transistor T1, the fourth transistor T4, the fifth transistor T5, the seventh transistor T7, and the eighth transistor T8 may be configured with two PMOS elements connected in series to constitute one transistor. However, the present disclosure is not limited thereto, the first transistor T1, the fifth transistor T5, the seventh transistor T7, and the eighth transistor T8 may be configured with one PMOS element (or one or more NMOS elements).

Figure 5:
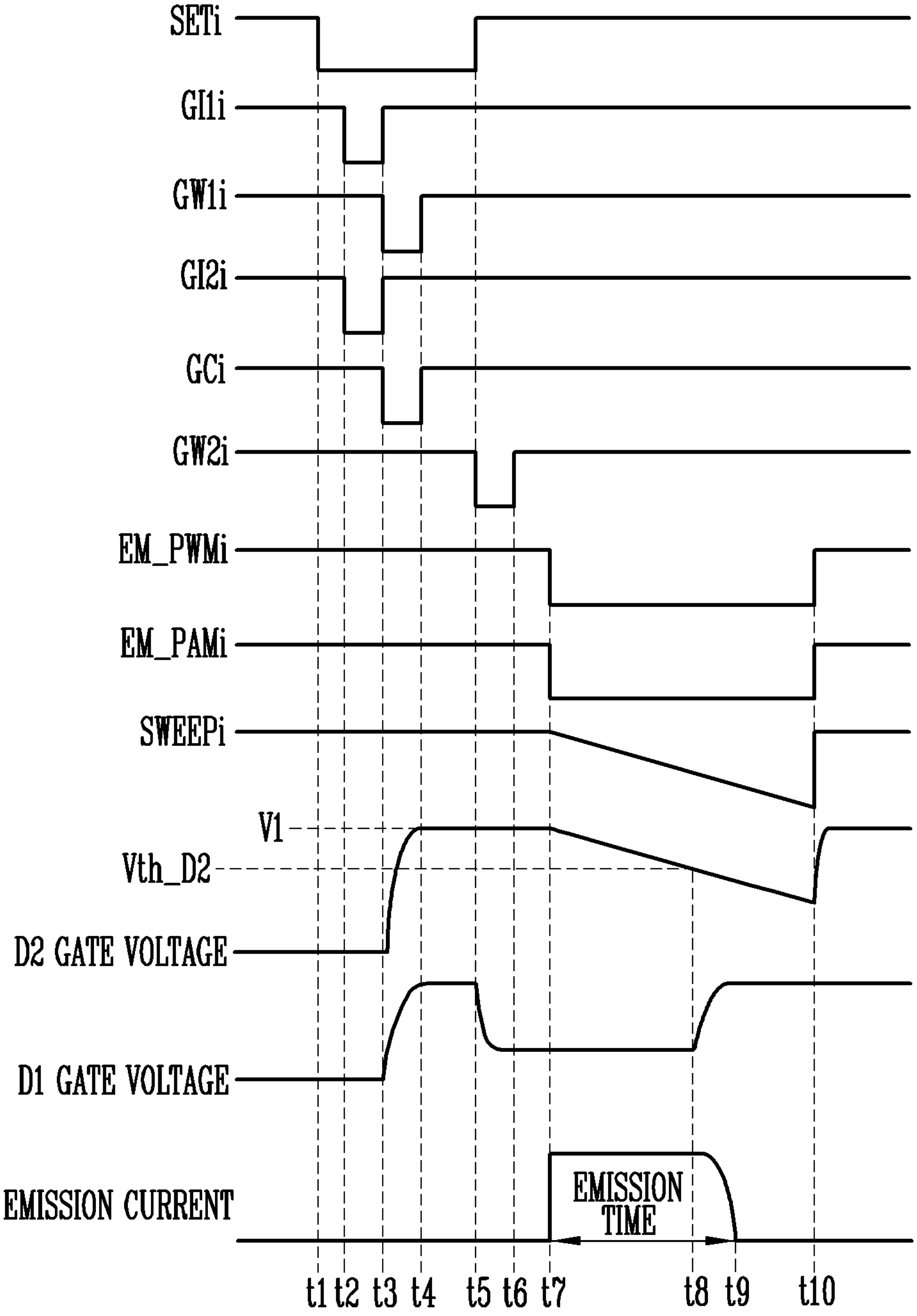
FIG. 5 is a timing diagram illustrating the configuration and the operation of the PWM pixel circuit in accordance with one or more embodiments of the present disclosure.

FIG. 5 is a timing diagram illustrating the configuration and the operation of the PWM pixel circuit in accordance with one or more embodiments of the present disclosure.

Referring to FIG. 5, one image frame period may include an initialization period in which a plurality of nodes or gate electrodes of a plurality of driving transistors, which are included in the pixel circuit, are initialized, may include a PWM data input and compensation period in which PWM data is input and a compensation operation is performed, may include a PAM voltage input period in which a PAM voltage is input, and an emission period in which a light-emitting element emits light.

Referring to FIGS. 4 and 5, in one or more embodiments, as the first to fourth transistors T1 to T4 and the ninth transistor T9 are turned on during the initialization period, each of the first reference node Nref1, the anode electrode ANODE, the gate electrode of the first driving transistor D1, the gate electrode of the second driving transistor D2, and the second reference node Nref2 may be initialized.

For example, a reset signal SETi having a low level may be provided to the pixel circuit from t1 to t7, and a first initialization signal GI1*i* having a low level and a second initialization signal GI2*i* having a low level may be provided to the pixel circuit from t2 to t3.

As the reset signal SETi is provided to a gate electrode of the first transistor T1 at t1, the first transistor T1 may be turned on. As the first transistor T1 is turned on, a reference voltage Vref from the reference power source Vref may be applied to a first reference node Nref1.

As the reset signal SETi is provided to a gate electrode of the second transistor T2 at t1, the second transistor T2 may be turned on. As the second transistor T2 is turned on, the anode electrode ANODE of the light-emitting element LD may be initialized to the first initialization voltage.

As the reset signal SETi is provided to a gate electrode of the ninth transistor T9 at t1, the ninth transistor T9 may be turned on. As the ninth transistor T9 is turned on, the second reference node Nref2 may be initialized to the sweep initialization voltage SWEEP_VGH having a high level.

As the first initialization signal GI1*i* is provided to a gate electrode of the third transistor T3 at t1, the third transistor T3 may be turned on. As the third transistor T3 is turned on, the gate electrode of the first driving transistor D1 may be initialized to the second initialization voltage.

As the second initialization signal GI2*i* is provided to a gate electrode of the fourth transistor T4 at t1, the fourth transistor T4 may be turned on. As the fourth transistor T4 is turned on, the gate electrode of the second driving transistor D2 may be initialized to the second initialization voltage. In one or more embodiments, the first initialization voltage may be a voltage for initializing the anode electrode ANODE of the light-emitting element, and the second initialization voltage may be a voltage for initializing the gate electrodes of the driving transistors. In one or more embodiments, the first initialization voltage and the second initialization voltage may have the same magnitude.

Referring to FIGS. 4 and 5, in one or more embodiments, as the fifth transistor T5 is turned on during the PWM data input and compensation period, a compensation operation of compensating for the threshold voltage of the first driving transistor D1 may be performed. As the sixth and seventh transistors T6 and T7 are turned on, the PWM data voltage VDATA may be applied to the gate electrode of the second driving transistor D2. The PWM data voltage VDATA may be a voltage corresponding to an input image. The PWM data voltage VDATA may be differently set according to a luminance.

For example, a compensation control signal GCi having a low level and a first scan signal GW1*i* having a low level may be provided to the pixel circuit from t3 to t4.

As the compensation control signal GCi is provided to a gate electrode of the fifth transistor T5 at t3, the fifth transistor T5 may be turned on. Accordingly, a voltage having a magnitude obtained by adding a PAM power voltage uVDD_PAM supplied from the first power source VDD and the threshold voltage of the first driving transistor D1 may be applied to the gate electrode of the first driving transistor D1. The voltage having the magnitude obtained by adding the PAM power voltage uVDD_PAM supplied from the first power source VDD and the threshold voltage of the first driving transistor D1 may be stored in the first capacitor C1.

As the first scan signal GW1*i* is provided to gate electrodes of the sixth and seventh transistors T6 and T7 at t3, the sixth and seventh transistors T6 and T7 may be turned on. Accordingly, a voltage having a magnitude obtained by adding the PWM data voltage VDATA and a threshold voltage of the second driving transistor D2 may be applied to the gate electrode of the second driving transistor D2. Referring to FIG. 5, a voltage of the gate electrode of the second driving transistor D2 may increase (e.g., may begin to increase) to V1 at t3. In one or more embodiments, the magnitude of V1 may be equal to the magnitude of the voltage, which is obtained by adding the PWM data voltage VDATA and the threshold voltage of the second driving transistor D2. Referring to FIG. 4, the voltage having the magnitude obtained by adding the PWM data voltage VDATA and the threshold voltage of the second driving transistor D2 may be stored in the second capacitor C2.

Referring to FIGS. 4 and 5, in one or more embodiments, as the eighth transistor T8 is turned on during the PAM voltage input period, the PAM voltage VPAM may be applied to the first reference node Nref1 from the PAM voltage input terminal. The PAM voltage VPAM may be a voltage constant regardless of the luminance.

For example, a second scan signal GW2*i* having a low level may be provided to the pixel circuit from t5 to t6. As the second scan signal GW2*i* is provided to a gate electrode of the eighth transistor T8 at t5, the eighth transistor T8 may be turned on. Accordingly, the PAM voltage VPAM may be applied to the first reference node Nref1. As the PAM voltage VPAM is applied to the first reference node Nref1, a voltage having a magnitude obtained by subtracting the reference voltage Vref from the PAM voltage VPAM may be applied to the gate electrode of the first driving transistor D1 due to the coupling effect. In other words, the potential of the gate electrode of the first driving transistor D1 may be decreased by the magnitude obtained by subtracting the reference voltage Vref from the PAM voltage VPAM. Accordingly, the potential of the gate electrode of the first driving transistor D1 can sufficiently become lower than the threshold voltage of the first driving transistor D1. Thus, the first driving transistor D1 can be turned on.

Referring to FIGS. 4 and 5, in one or more embodiments, the tenth, eleventh, and twelfth transistors T10 to T12 may be turned on during the emission period. In addition, a sweep signal SWEEPi linearly decreasing as time elapses may be provided to the second reference node Nref2 during the emission period.

For example, from t7 to t10, a first emission control signal EM_PAMi may be provide to the tenth transistor T10, and a second emission control signal EM_PWMi may be provided to the eleventh and twelfth transistors T11 and T12. In addition, the sweep signal SWEEPi may be provided to the second reference node Nref2 from t7 to t10.

As the tenth transistor T10 is turned on at t7, a driving current may flow from the first power source VDD to the light-emitting element LD via the first driving transistor D1. Accordingly, the light-emitting element LD may start light emission.

When the sweep signal SWEEPi is provided to the second reference node Nref2 at t7, the potential of the gate electrode of the second driving transistor D2 may linearly decrease as time elapses due to the coupling effect. The potential of the gate electrode of the second driving transistor D2 may decrease, and may then become lower than the threshold voltage of the second driving transistor D2 at t8. The second driving transistor D2 may be turned on. When the second driving transistor D2 is turned on, a PWM power voltage uVDD_PWM supplied from the second power source uVDD_PWM may be applied as a driving voltage to the first reference node Nref1. When the PWM power voltage uVDD_PWM having a high level is applied to the first reference node Nref1, the potential of the gate electrode of the first driving transistor D1 may increase due to the coupling effect. The potential of the gate electrode of the first driving transistor D1 may increase to a magnitude that is greater than the threshold voltage of the first driving transistor D1. Therefore, the first driving transistor D1 may be turned off. When the first driving transistor D1 is turned off, the driving current may not flow. Therefore, the light-emitting element LD may stop light emission.

As described above, the pixel may control the light-emitting element LD to emit light for a time corresponding to the PWM data voltage VDATA. As compared with the pixel circuit shown in FIG. 2, in the case of the pixel circuit shown in FIGS. 3 and 4, the potential of the gate electrode of the first driving transistor D1 is adjusted instead of adjusting a separate switching transistor, so that the time for which the light-emitting element LD emits light can be controlled. In addition, unlike the pixel circuit shown in FIG. 2, the pixel circuit shown in FIGS. 3 and 4 does not include any switching transistor of which threshold voltage is not compensated, and thus little to no deviation for each pixel exists with the same luminance.

Hereinafter, a threshold voltage compensation operation of driving transistors included in the pixel circuit in accordance with one or more embodiments of the present disclosure will be described in detail.

In general, an equation for a magnitude of a driving current flowing via a driving transistor is as follows.

$$I_{ds} = k \times \frac{W}{L}(V_{gs} - V_{th})^2 \quad \text{Equation 1}$$

Ids may be the driving current, k may be a constant, W/L may be a process variable, Vgs may be a potential difference between the gate electrode and a source electrode, and Vth may be a threshold voltage of the driving transistor.

In the case of the first driving transistor D1, as described with reference to FIG. 5, a voltage (uVDD_PAM+Vth_D1), which has a magnitude obtained by adding the PAM power voltage uVDD_PAM and the threshold voltage Vth_D1 of the first driving transistor D1, may be stored in the gate electrode of the first driving transistor D1 by the compensation operation.

When the PAM voltage VPAM is input to the first reference node Nref1 in the PAM voltage input period, a voltage (Vref−VPAM), which has a magnitude obtained by subtracting the PAM voltage VPAM from the reference voltage Vref, may be applied to the gate electrode of the first driving transistor D1. Therefore, the magnitude of a potential Vg of the gate electrode of the first driving transistor D1 may be Vref−VPAM−uVDD_PAM+Vth_D1.

A potential of the source electrode of the first driving transistor D1 may be constant as the PAM power voltage uVDD_PAM. Therefore, the magnitude of a driving current Ids of the first driving transistor D1 may be equal to a result of the following Equation 2.

$$I_{ds} = k \times \frac{W}{L}(V_{ref} - V_{PAM} + \text{uVDD\_PAM} + V_{th}\text{\_D1} - \text{uVDD\_PAM} - V_{th}\text{\_D1})^2 \quad \text{Equation 2}$$

In Equation 2, the threshold voltage Vth_D1 of the first driving transistor D1 and the PAM power voltage uVDD_PAM may be erased. Therefore, the magnitude of the driving current Ids of the first driving transistor D1 may be equal to a result of the following Equation 3.

$$I_{ds} = k \times \frac{W}{L}(V_{ref} - V_{PAM})^2 \quad \text{Equation 3}$$

Referring to Equation 3, in some embodiments, the PAM power voltage uVDD_PAM may be compensated in addition to the threshold voltage of the first driving transistor D1. In general, when a driving transistor is a PMOS element, a source electrode of the driving transistor is directly connected to a power source, and therefore, a deviation of driving current for each pixel may occur due to a voltage drop (IR drop) caused by a resistance component existing between the power source and the source electrode of the driving transistor. In accordance with one or more embodiments, the PAM power voltage uVDD_PAM may be compensated by the compensation operation, so that the deviation of driving current for each pixel due to the IR drop can be reduced or prevented.

In the case of the second driving transistor D2, as described with reference to FIG. 5, a voltage (VDATA+Vth_D2), which has a magnitude obtained by adding the PWM data voltage VDATA and the threshold voltage of the second driving transistor D2, may be stored in the gate electrode of the second driving transistor D2 in the PWM data input and compensation period. Therefore, the magnitude of a potential Vg of the gate electrode of the second driving transistor D2 may be VDATA+Vth_D2. A potential of a source electrode of the second driving transistor D2 may be constant as the PWM power voltage uVDD_PWM. Therefore, the magnitude of a driving current Ids of the second driving transistor D2 may be equal to a result of the following Equation 4.

$$I_{ds} = k \times \frac{W}{L}(VDATA + V_{th}\text{\_D2} - \text{uVDD\_PWN} - V_{th}\text{\_D2})^2 \quad \text{Equation 4}$$

In Equation 4, the threshold voltage Vth_D2 of the second driving transistor D2 may be erased. Therefore, the magnitude of the driving current Ids of the second driving transistor D2 may be equal to a result of the following Equation 5.

$$I_{ds} = k \times \frac{W}{L}(VDATA - \text{uVDD\_PWM})^2 \quad \text{Equation 5}$$

Referring to Equation 5, in some embodiments, the threshold voltage of the second driving transistor D2 may be compensated.

In the case of a general pixel circuit, an operation of applying a gate voltage to a driving transistor to allow a driving current to flow, and an operation of compensating for a threshold voltage of the driving transistor, may be concurrently or substantially simultaneously performed. Referring to FIGS. 4 and 5, in one or more embodiments, a compensation operation of the threshold voltage of the first driving transistor D1 and an operation of inputting the PAM voltage VPAM may be performed as separate respective operations. That is, the compensation operation may be performed by applying the compensation control signal GCi to the gate electrode of the fifth transistor T5 at t3, and a voltage corresponding to the PAM voltage VPAM may be applied to the gate electrode of the first driving transistor D1 by applying the second scan signal GW2*i* to the gate electrode of the eighth transistor T8 at t5. A width variation of the compensation control signal GCi is possible, and thus a threshold voltage compensation time of the first driving transistor D1 can be sufficiently secured.

Figure 6:
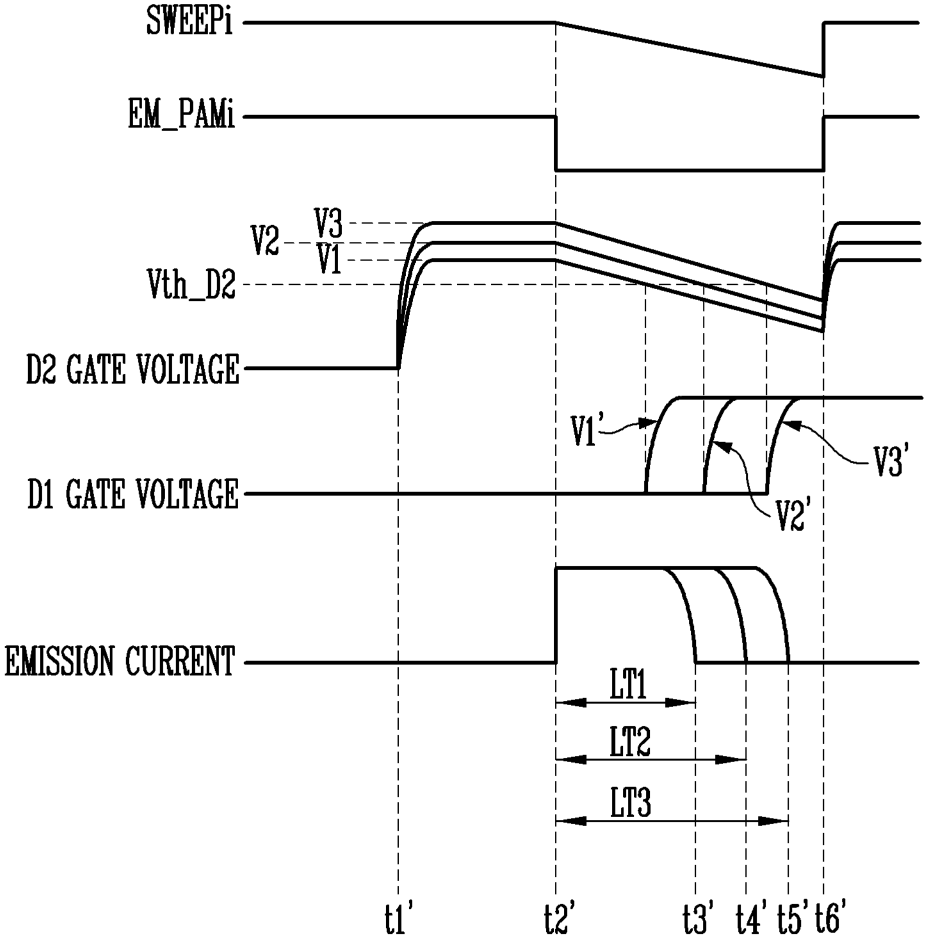
FIG. 6 is a timing diagram illustrating in detail the configuration and the operation of the PWM pixel circuit in accordance with one or more embodiments of the present disclosure.

FIG. 6 is a timing diagram illustrating in detail the configuration and the operation of the PWM pixel circuit in accordance with one or more embodiments of the present disclosure.

Referring to FIGS. 6, V1, V2, and V3 may be voltages applied to the gate electrode of the second driving transistor D2 in the PWM data input and compensation period described in FIG. 5.

V1', V2', and V3' may be waveforms representing voltage changes of the gate electrode of the first driving transistor D1 when the voltages V1, V2, or V3 is applied to the gate electrode of the second driving transistor D2.

LT1, LT2, and LT3 may represent time periods during which the light-emitting element LD emits light when the voltages V1, V2, or V3 is applied to the gate electrode of the second driving transistor D2.

Referring to FIGS. 4 and 6, the voltages V1, V2, or V3 may be applied to the gate electrode of the second driving transistor D2 in the PWM data input and compensation period. The voltages V1, V2, and V3 may have different magnitudes. That is, at t1', the voltages V1, V2, or V3 may be applied to the gate electrode of the second driving transistor D2. V1, V2, and V3 may be voltages having magnitudes corresponding different luminances.

As the sweep signal SWEEPi is provided to the second capacitor C2 at t2', the potential of the gate electrode of the second driving transistor D2 may linearly decrease. Because the voltages V1, V2, and V3 have different magnitudes, a time at which the potential of the gate electrode of the second driving transistor D2 reaches the threshold voltage Vth_D2 of the second driving transistor D2 may vary for each case. Accordingly, a time at which the first driving transistor D1 is turned off may vary for each case.

Referring to FIG. 6, the magnitude of the voltage applied to the gate electrode of the second driving transistor D2 in the PWM data input and compensation period becomes larger, the light-emitting element may emit light for a longer time. That is, when the voltage applied to the gate electrode of the second driving transistor D2 is the V1, the light-emitting element may emit light for an amount of time LT1. When the voltage applied to the gate electrode of the second driving transistor D2 is the V2, the light-emitting element may emit light for an amount of time LT2, which is longer than the amount of time LT1. When the voltage applied to the gate electrode of the second driving transistor D2 is the V3, the light-emitting element may emit light for an amount of time LT3, which is longer than the amount of time LT2.

Figure 7:
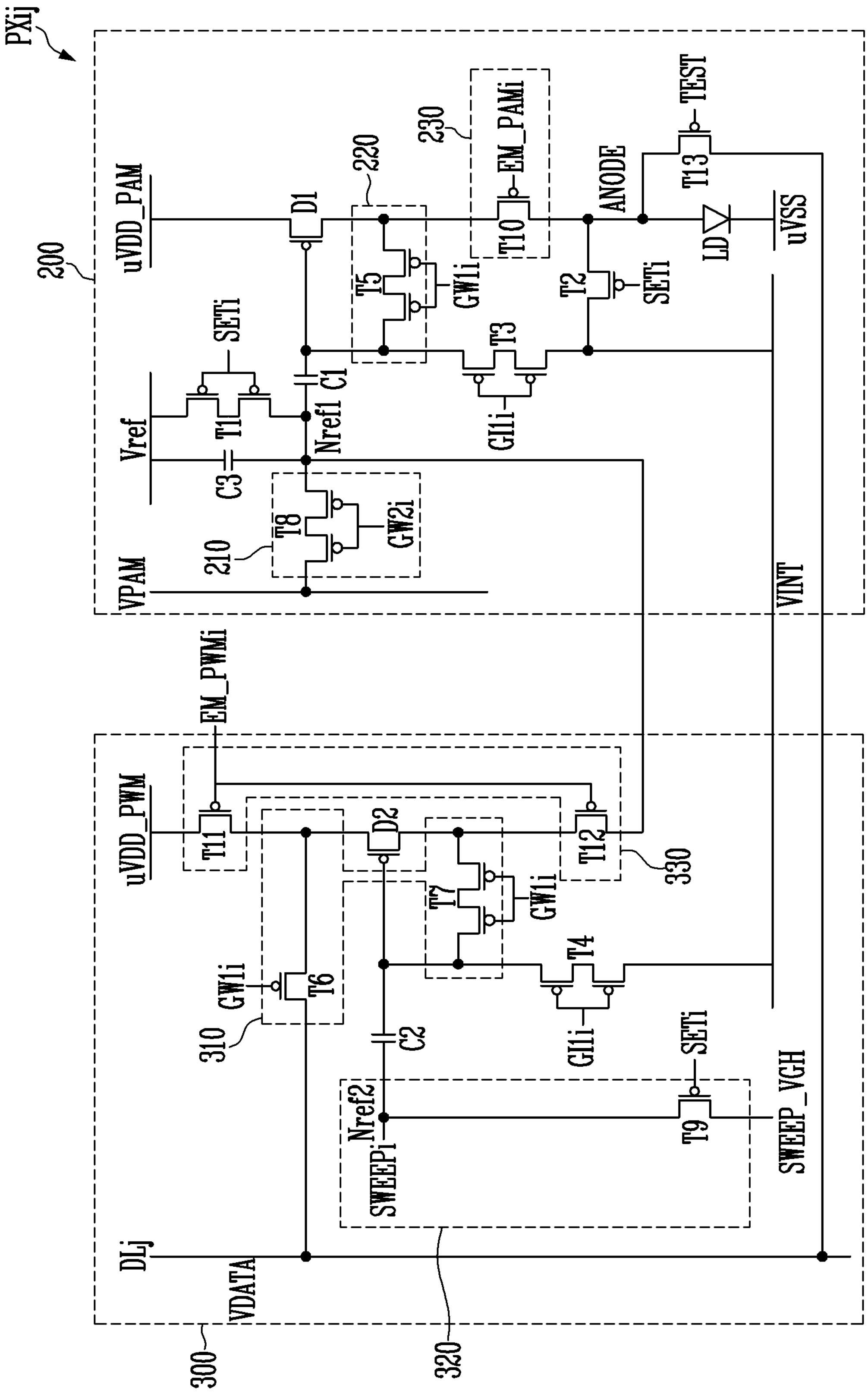
FIG. 7 is a circuit diagram illustrating a configuration and an operation of a PWM pixel circuit in accordance with one or more other embodiments of the present disclosure.

FIG. 7 is a circuit diagram illustrating a configuration and an operation of a PWM pixel circuit in accordance with one or more other embodiments of the present disclosure.

Referring to FIG. 7, the same initialization signal may be concurrently or substantially simultaneously provided to the gate electrode of the third transistor T3 and the gate electrode of the fourth transistor T4 during the initialization period.

That is, in the case of the pixel circuit shown in FIG. 4, during the initialization period, the first initialization signal GI1*i* is provided to the gate electrode of the third transistor T3, and the second initialization signal GI2*i* is provided to the gate electrode of the fourth transistor T4. However, in the case of the pixel circuit shown in FIG. 7, the first initialization signal GI1*i* may be provided to both gate electrodes of the third and fourth transistors T3 and T4 during the initialization period.

In addition, for the PWM data input and compensation period, the same signal may be provided to the gate electrodes of the fifth, sixth, and seventh transistors T5 to T7.

That is, in the case of the pixel circuit shown in FIG. 4, during the PWM data input and compensation period, the compensation control signal GCi is provided to the gate electrode of the fifth transistor T5, and the first scan signal GW1*i* is provided to the gate electrodes of the sixth and seventh transistors T6 and T7. However, in the case of the pixel circuit shown in FIG. 7, the first scan signal GW1*i* may be provided to all the gate electrodes of the fifth, sixth, and seventh transistors T5 to T7 during the PWM data input and compensation period. Accordingly, the number of all signals provided to gate electrodes can be decreased, and the degree of integration can be improved in a manufacturing process of the display device.

Figure 8:
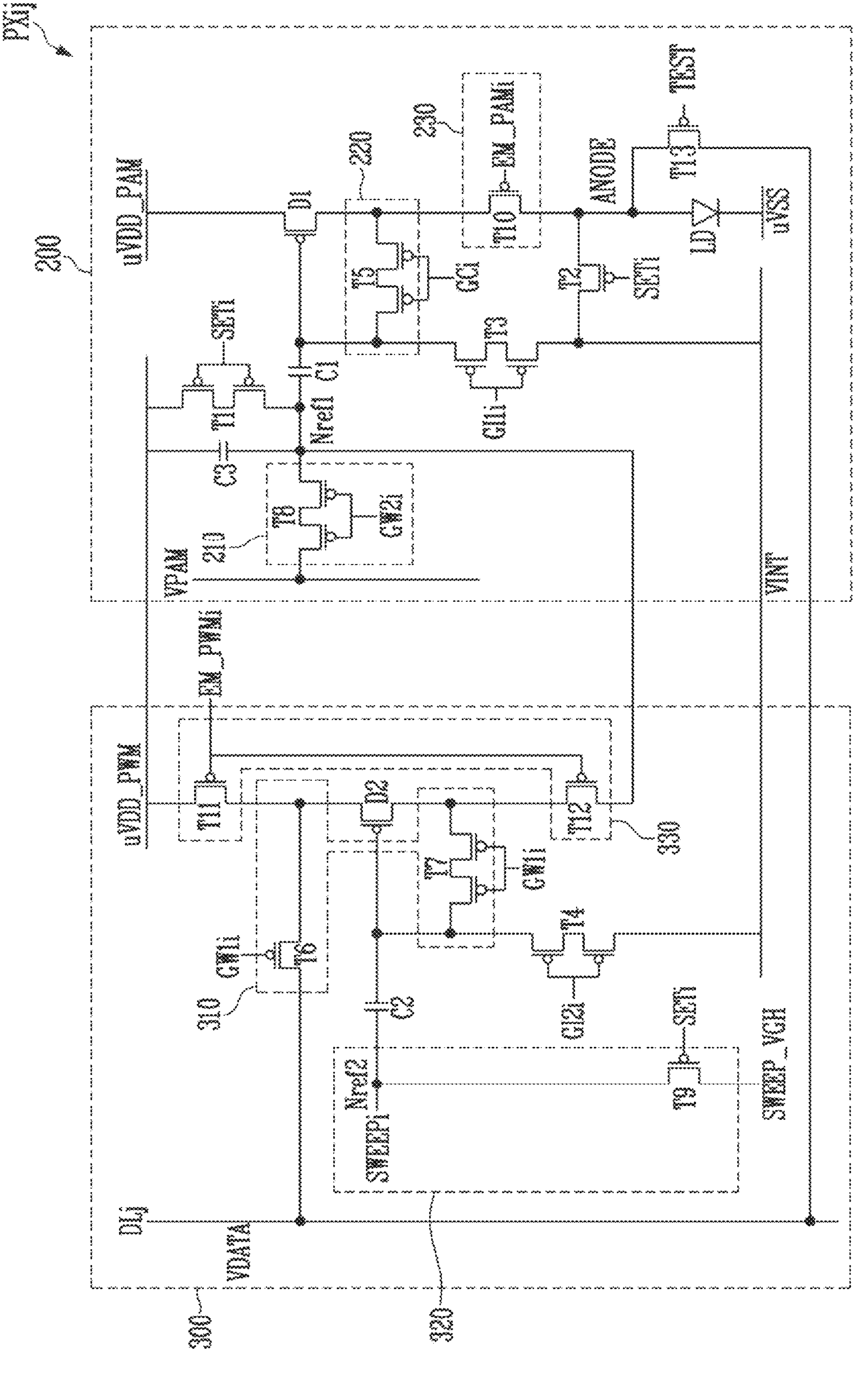
FIG. 8 is a circuit diagram illustrating a configuration and an operation of a PWM pixel circuit in accordance with one or more other embodiments of the present disclosure.

FIG. 8 is a circuit diagram illustrating a configuration and an operation of a PWM pixel circuit in accordance with one or more other embodiments of the present disclosure.

Referring to FIG. 8, in the case of the pixel circuit shown in FIG. 8, the reference power source Vref may be omitted as compared with the pixel circuit shown in FIG. 4. Instead, in the case of the pixel circuit shown in FIG. 8, the first transistor T1 and the third capacitor C3 may be connected to the second power source uVDD_PWM to which the PWM power voltage uVDD_PWM is supplied. In one or more embodiments, the first transistor T1 and the third capacitor C3 are not connected to the second power source uVDD_PWM, but instead may be connected to the first power source VDD to which the PAM power voltage uVDD_PAM is supplied.

Accordingly, the number of signals or voltages, supplied to the pixel circuit, can be decreased.

Figure 9:
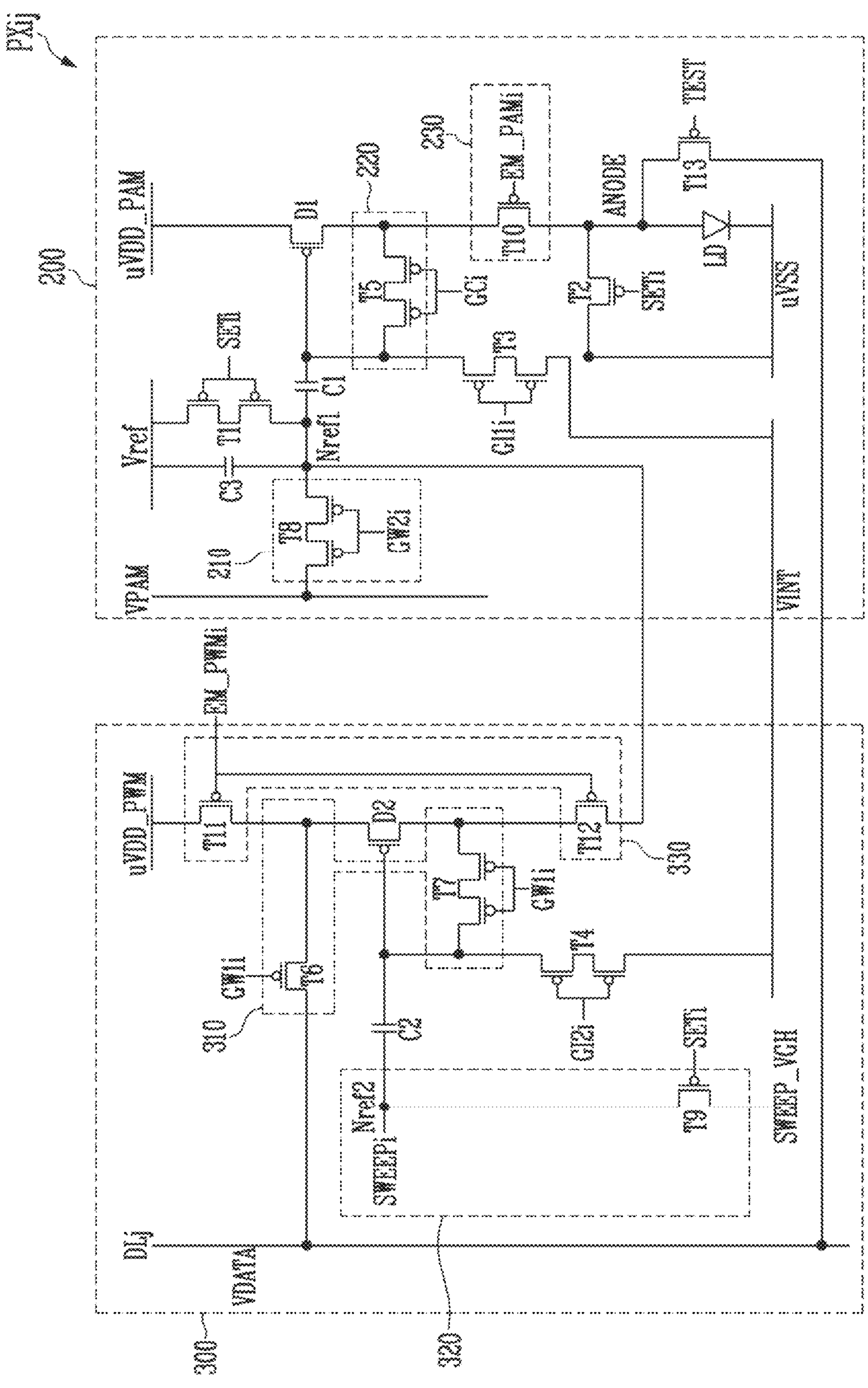
FIG. 9 is a circuit diagram illustrating a configuration and an operation of a PWM pixel circuit in accordance with one or more other embodiments of the present disclosure.

FIG. 9 is a circuit diagram illustrating a configuration and an operation of a PWM pixel circuit in accordance with one or more other embodiments of the present disclosure.

Referring to FIG. 9, in the case of the pixel circuit shown in FIG. 9, one electrode of the second transistor T2 for initializing the anode electrode ANODE of the light-emitting element LD is not connected to the initialization power source VINT but may be connected to a third power source uVSS, as compared with the pixel circuit shown in FIG. 4.

The third power source uVSS may be a power source connected to a cathode electrode of the light-emitting element LD. A potential of the third power source uVSS may be lower than a magnitude of the PAM power voltage uVDD_PAM supplied to the first power source VDD.

Accordingly, current stress of lines connected to the initialization power source VINT can be reduced.

Figure 10:
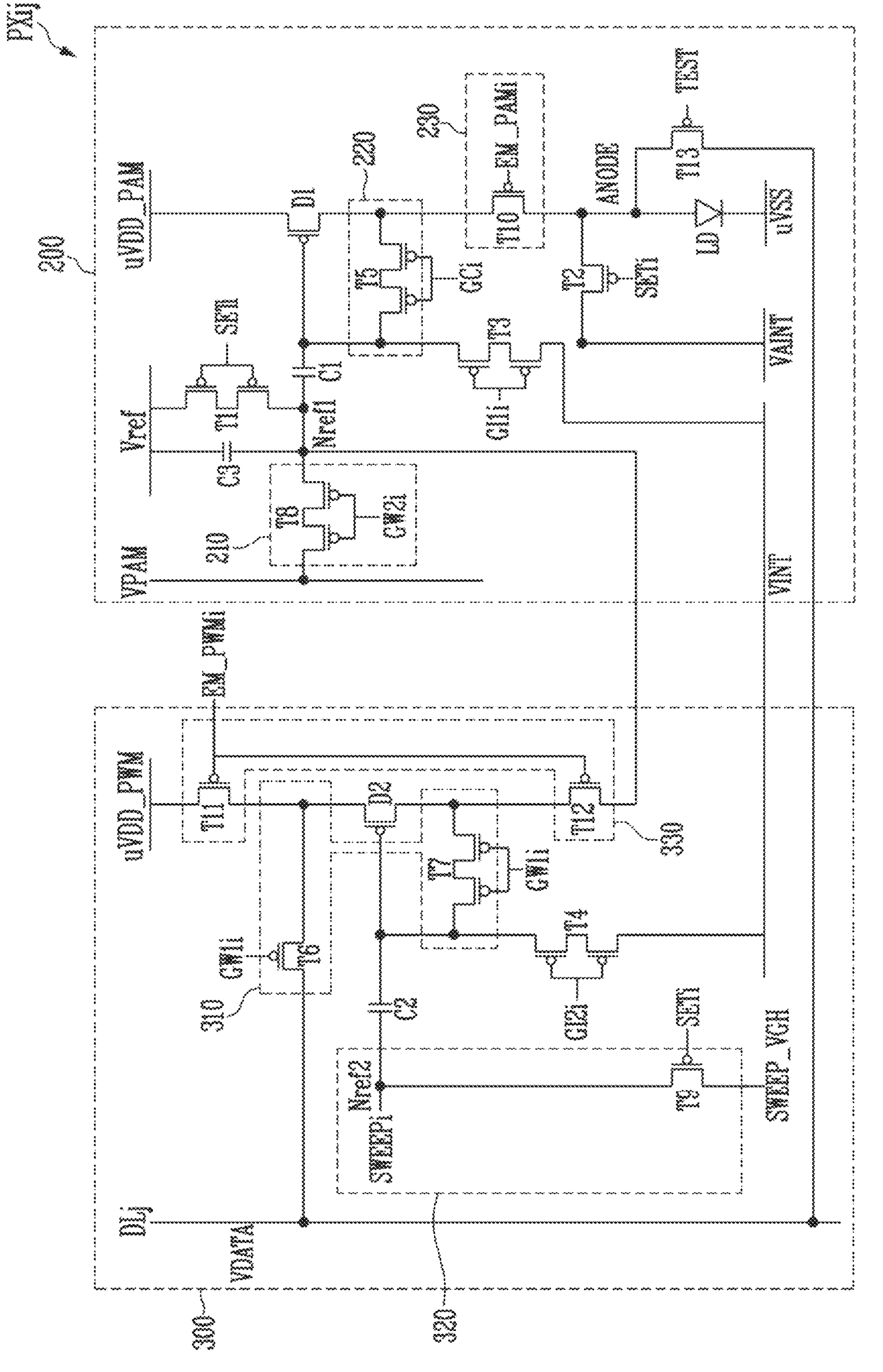
FIG. 10 is a circuit diagram illustrating a configuration and an operation of a PWM pixel circuit in accordance with one or more other embodiments of the present disclosure.

FIG. 10 is a circuit diagram illustrating a configuration and an operation of a PWM pixel circuit in accordance with one or more other embodiments of the present disclosure.

Referring to FIG. 10, in the case of the pixel circuit shown in FIG. 10, one electrode of the second transistor T2 for initializing the anode electrode ANODE of the light-emitting element LD may be connected to a separate initialization power source VAINT that is different from the initialization power source VINT, as compared with the pixel circuit shown in FIG. 4. The magnitude of an initialization voltage supplied from the separate initialization power source VAINT may be adjusted according to the magnitude of a voltage applied to the third power source uVSS connected to the cathode electrode of the light-emitting element LD.

Accordingly, when the magnitude of a voltage applied to the third power source uVSS is changed, the initialization voltage supplied from the separate initialization power source VAINT is adjusted, thereby applying an initialization voltage under an optimum condition to the anode electrode ANODE of the light-emitting element LD.

In the display device in accordance with the present disclosure, an internal compensation operation can be effectively performed in the pixel circuit using the PWM pixel driving method.

Embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims, with functional equivalents thereof to be include therein.

What is claimed is:

1. A pixel circuit for adjusting a luminance of a pixel by controlling an emission time of a light-emitting element within one image frame period, the pixel circuit comprising:

a constant current driver comprising a first driving transistor for controlling a driving current through a light-emitting element from a first power source, a first electrode of the first driving transistor being connected to the first power source, and a second electrode of the first driving transistor being connected to an anode electrode of the light-emitting element; and an emission time controller comprising a second driving transistor between a second power source and the constant current driver, the emission time controller being configured to control the emission time by turning off the first driving transistor after a time at which a Pulse Width Modulation (PWM) data voltage corresponding to an input image is applied to a gate electrode of the second driving transistor, and based on a magnitude of the PWM data voltage, wherein the second driving transistor is configured to be turned on based on the magnitude of the PWM data voltage, to transfer a driving voltage applied from the second power source to the constant current driver.

2. The pixel circuit of claim 1, wherein the emission time controller further comprises:

a PWM data input for supplying the PWM data voltage to the gate electrode of the second driving transistor; and a sweep signal transferer for allowing a potential of the gate electrode of the second driving transistor to linearly decrease after the PWM data voltage is supplied to the gate electrode of the second driving transistor, wherein the constant current driver further comprises:

a Pulse Amplitude Modulation (PAM) voltage input for setting a potential of a gate electrode of the first driving transistor for supplying the driving current to the anode electrode of the light-emitting element; and a compensation operation controller for performing a compensation operation of compensating for a threshold voltage or a mobility of the first driving transistor, wherein the second driving transistor is configured to be turned on at a time at which the potential of the gate electrode of the second driving transistor becomes lower than a threshold voltage of the second driving transistor according to a sweep signal, to transfer the driving voltage to the constant current driver, and wherein the first driving transistor is configured to be turned off at a time at which the potential of the gate electrode of the first driving transistor becomes higher than the threshold voltage of the first driving transistor due to the driving voltage, to stop a light emission operation of the light-emitting element.

3. The pixel circuit of claim 2, wherein the constant current driver further comprises:

a first capacitor between the gate electrode of the first driving transistor and the PAM voltage input, and configured to store a voltage corresponding to a PAM voltage;

a first transistor between a reference power source and a first reference node, which is between the first capacitor and the PAM voltage input, and configured to transfer a reference voltage to the first reference node;

a third capacitor connected in parallel to the first transistor between the first reference node and the reference power source;

a second transistor between an initialization power source and the anode electrode, and configured to transfer a first initialization voltage; and a third transistor between the gate electrode of the first driving transistor and the initialization power source, and configured to transfer a second initialization voltage to the gate electrode of the first driving transistor, wherein the emission time controller further comprises:

a second capacitor between the gate electrode of the second driving transistor and the sweep signal transferer, and configured to store the PWM data voltage; and a fourth transistor between the gate electrode of the second driving transistor and the initialization power source, and configured to transfer the second initialization voltage to the gate electrode of the second driving transistor, wherein the compensation operation controller comprises a fifth transistor between the second electrode of the first driving transistor and the gate electrode of the first driving transistor, wherein the PWM data input comprises:

a sixth transistor between a data line to which the PWM data voltage is input and a first electrode of the second driving transistor; and a seventh transistor between a second electrode of the second driving transistor and the gate electrode of the second driving transistor, wherein the PAM voltage input comprises an eighth transistor between a PAM voltage input terminal and the first reference node, and wherein the sweep signal transferer comprises a ninth transistor connected to a second reference node that is between a sweep signal input terminal and the second capacitor, and configured to transfer, to the second reference node, a sweep initialization voltage for initializing the second reference node.

4. The pixel circuit of claim 3, wherein the one image frame period comprises:

an initialization period in which the first and second reference nodes or the gate electrodes of the first and second driving transistors are initialized;

a PWM data input and compensation period in which the PWM data voltage is input and the compensation operation is performed;

a PAM voltage input period in which the PAM voltage is input; and an emission period in which the light-emitting element emits light, wherein, in the initialization period, each of the first reference node, the anode electrode, the gate electrode of the first driving transistor, the gate electrode of the second driving transistor, and the second reference node is initialized as the first transistor, the second transistor, the third transistor, the fourth transistor, and the ninth transistor are turned on, wherein, in the PWM data input and compensation period, the compensation operation is performed as the fifth transistor is turned on, and as the PWM data voltage is supplied to the gate electrode of the second driving transistor as the sixth transistor and the seventh transistor are turned on, and wherein, in the PAM voltage input period, the eighth transistor is turned on to transfer the PAM voltage to the first reference node.

5. The pixel circuit of claim 4, wherein the constant current driver further incudes a first emission controller comprising a tenth transistor between the second electrode of the first driving transistor and the anode electrode of the light-emitting element, wherein the emission time controller further comprises:

a second emission controller comprising an eleventh transistor between the first electrode of the second driving transistor and the second power source; and a twelfth transistor between the second electrode of the second driving transistor and the first reference node, wherein the tenth transistor is configured to be turned on during the emission period to transfer the driving current flowing through the first driving transistor to the anode electrode, and wherein the eleventh transistor and the twelfth transistor are configured to be turned on during the emission period to transfer the driving voltage to the first reference node.

6. The pixel circuit of claim 3, wherein the constant current driver further comprises a thirteenth transistor between the anode electrode of the light-emitting element and the data line, and configured to detect a voltage applied from the first power source.

7. The pixel circuit of claim 3, a gate electrode of the third transistor and a gate electrode of the fourth transistor are configured to receive a same signal.

8. The pixel circuit of claim 3, wherein a gate electrode of the fifth transistor, a gate electrode of the sixth transistor, and a gate electrode of the seventh transistor are configured to receive a same signal.

9. The pixel circuit of claim 3, wherein the reference power source is the same as the first power source or the second power source.

10. The pixel circuit of claim 3, wherein the initialization power source comprises:

a first initialization power source connected to a cathode electrode of the light-emitting element for supplying the first initialization voltage; and a second initialization power source for supplying the second initialization voltage.

11. The pixel circuit of claim 3, wherein the initialization power source comprises a first initialization power source for supplying the first initialization voltage and a second initialization power source for supplying the second initialization voltage, and wherein a magnitude of the first initialization voltage is configured to be adjusted according to a magnitude of a voltage of a third power source connected to a cathode electrode of the light-emitting element.

12. A method for driving a display device comprising a pixel circuit for adjusting a luminance of a pixel by controlling an emission time of a light-emitting element within one image frame period, the method comprising:

performing a compensation operation of compensating for a threshold voltage or a mobility of a first driving transistor of the pixel circuit to control a driving current flowing through a light-emitting element from a first power source;

applying a PWM data voltage corresponding to an input image to a gate electrode of a second driving transistor of the pixel circuit;

turning on the first driving transistor by applying a PAM voltage to a first node;

allowing the light-emitting element to emit light by applying an emission control signal to the pixel circuit; and transferring a driving voltage from a second power source to a first reference node by turning on the second driving transistor after applying the PWM data voltage when the emission control signal is applied to the pixel circuit to turn off the first driving transistor.

13. The method of claim 12, wherein the pixel circuit comprises a first capacitor connected to a gate electrode of the first driving transistor, and a second capacitor connected to the gate electrode of the second driving transistor, wherein the transferring of the driving voltage to the first reference node comprises inputting, to the second capacitor, a sweep signal for linearly decreasing a potential of the gate electrode of the second driving transistor as time elapses from when the emission control signal is applied to the pixel circuit, wherein the second driving transistor is turned on when the potential of the gate electrode of the second driving transistor becomes lower than a threshold voltage of the second driving transistor according to the sweep signal, and wherein the first driving transistor is turned off at a time at which a potential of the gate electrode of the first driving transistor becomes higher than the threshold voltage of the first driving transistor according to the driving voltage.

14. The method of claim 13, further comprising performing an initialization operation of initializing the gate electrodes of the first driving transistor and the second driving transistor, an anode electrode of the light-emitting element, the first reference node, and a second reference node before the compensation operation is performed, wherein the performing of the initialization operation comprises:

providing the pixel circuit with a reset signal for initializing the anode electrode, the first reference node, and the second reference node;

providing the pixel circuit with a first initialization signal for initializing the gate electrode of the first driving transistor; and providing the pixel circuit with a second initialization signal for initializing the gate electrode of the second driving transistor.

15. The method of claim 14, wherein the first initialization signal and the second initialization signal are a same signal.

16. The method of claim 14, wherein the providing of the pixel circuit with the reset signal comprises providing the reset signal to a gate electrode of a first transistor that is between a reference power source and the first reference node, and wherein the reference power source is the same as the first power source or the second power source.

17. The method of claim 14, wherein the providing of the pixel circuit with the reset signal comprises providing the reset signal to a gate electrode of a second transistor that is between an initialization power source and the anode electrode, wherein the providing of the pixel circuit with the second initialization signal comprises providing the second initialization signal to a gate electrode of a third transistor that is between the initialization power source and the gate electrode of the first driving transistor, wherein the providing of the pixel circuit with the second initialization signal comprises providing the second initialization signal to a gate electrode of a fourth transistor that is between the initialization power source and the gate electrode of the second driving transistor, wherein the initialization power source comprises a first initialization power source for initializing the anode electrode, and a second initialization power source for initializing the gate electrode of the first driving transistor and the gate electrode of the second driving transistor, and wherein the first initialization power source is connected to a cathode electrode of the light-emitting element.

18. The method of claim 14, wherein the providing of the pixel circuit with the reset signal comprises providing the reset signal to a gate electrode of a second transistor that is between an initialization power source and the anode electrode, wherein the providing of the pixel circuit with the first initialization signal comprises providing the first initialization signal to a gate electrode of a third transistor that is between the initialization power source and the gate electrode of the first driving transistor, wherein the providing of the pixel circuit with the second initialization signal comprises providing the second initialization signal to a gate electrode of a fourth transistor that is between the initialization power source and the gate electrode of the second driving transistor, wherein the initialization power source comprises a first initialization power source for initializing the anode electrode, and a second initialization power source for initializing the gate electrode of the first driving transistor and the gate electrode of the second driving transistor, and wherein a magnitude of an initialization voltage provided from the first initialization power source is adjusted according to a magnitude of a voltage applied to a third power source connected to a cathode electrode of the light-emitting element.

19. The method of claim 12, wherein the performing of the compensation operation comprises providing a compensation control signal, which is for compensating for the threshold voltage or the mobility of the first driving transistor with respect to the pixel circuit, to a gate electrode of a fifth transistor that is between a gate electrode and a drain electrode of the first driving transistor, and wherein the applying of the PWM data voltage comprises inputting a data control signal, which is for applying the PWM data voltage to the gate electrode of the second driving transistor, to a gate electrode of a sixth transistor that is between a data line and a source electrode of the second driving transistor, and to a gate electrode of a seventh transistor that is between the gate electrode of the second driving transistor and the source electrode of the second driving transistor.

20. The method of claim 19, wherein the compensation control signal and the data control signal are connected to a same signal line, and are concurrently transferred to the pixel circuit.

* * * * *